United States Patent
Hirth et al.

(10) Patent No.: US 11,174,775 B2
(45) Date of Patent: Nov. 16, 2021

(54) EXHAUST GAS AFTERTREATMENT DEVICE

(71) Applicant: Vitesco Technologies GmbH, Hannover (DE)

(72) Inventors: Peter Hirth, Schwalbach a. Ts. (DE); Katrin Konieczny, Schwalbach a. Ts. (DE); Thomas Nagel, Schwalbach a. Ts. (DE); Holger Stock, Schwalbach a. Ts. (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/976,557

(22) PCT Filed: Feb. 26, 2019

(86) PCT No.: PCT/EP2019/054759
§ 371 (c)(1),
(2) Date: Aug. 28, 2020

(87) PCT Pub. No.: WO2019/166444
PCT Pub. Date: Sep. 6, 2019

(65) Prior Publication Data
US 2020/0408130 A1    Dec. 31, 2020

(30) Foreign Application Priority Data
Mar. 1, 2018   (DE) .................... 10 2018 203 066.9

(51) Int. Cl.
*F01N 3/28*   (2006.01)
*B01J 35/04*  (2006.01)
*F01N 1/02*   (2006.01)

(52) U.S. Cl.
CPC ............ *F01N 3/2885* (2013.01); *B01J 35/04* (2013.01); *F01N 1/02* (2013.01); *F01N 3/2803* (2013.01);
(Continued)

(58) Field of Classification Search
CPC ...... F01N 3/2885; F01N 1/02; F01N 2230/04; F01N 2330/32; F01N 2490/02
(Continued)

(56) References Cited

U.S. PATENT DOCUMENTS 4,048,092 A   9/1977  Davies et al.
4,094,644 A   6/1978  Wagner
(Continued)

FOREIGN PATENT DOCUMENTS

BR   9307605    6/1999
CN   1809688    7/2006
(Continued)

OTHER PUBLICATIONS

Office Action for the corresponding German Patent Application No. 10 2018 203 066.9.
(Continued)

*Primary Examiner* — Tom P Duong
(74) *Attorney, Agent, or Firm* — Cozen O'Connor

(57) ABSTRACT

A device for the aftertreatment of exhaust gases of an internal combustion engine, having at least one catalytic converter, through which exhaust gas can flow, and at least one muffler formed by a closed volume and through which exhaust gas can flow along an inflow section to an outflow section. The catalytic converter is formed by a honeycomb body that has a plurality of flow channels through which exhaust gas can flow. The honeycomb body is accommodated in a casing tube, which surrounds the honeycomb body, and is connected to the casing tube in a materially
(Continued)

bonded manner. The catalytic converter is arranged in the interior of the muffler.

11 Claims, 2 Drawing Sheets

(52) U.S. Cl.
CPC ...... *F01N 2230/04* (2013.01); *F01N 2330/32* (2013.01); *F01N 2490/02* (2013.01); *F01N 2490/15* (2013.01)

(58) Field of Classification Search
USPC .................................. 422/180; 181/255, 264
See application file for complete search history.

(56) References Cited

U.S. PATENT DOCUMENTS

| | | | |
|---|---|---|---|
| 5,618,501 | A | 4/1997 | Wieres et al. |
| 5,809,776 | A | 9/1998 | Holtermann et al. |
| 6,393,835 | B1 | 5/2002 | Stoll et al. |
| 6,941,749 | B1 | 9/2005 | Noirot |
| 7,334,402 | B2* | 2/2008 | Hiraga .................... F01N 1/084 181/255 |
| 2003/0110763 | A1 | 6/2003 | Pawson et al. |
| 2006/0283180 | A1 | 12/2006 | Hiraga et al. |
| 2008/0093163 | A1* | 4/2008 | Frederiksen .......... F01N 3/0222 181/264 |

FOREIGN PATENT DOCUMENTS

| | | |
|---|---|---|
| CN | 201794642 U | 4/2011 |
| CN | 205990945 U | 3/2017 |
| DE | 69103864 | 1/1995 |
| DE | 10123359 | 11/2002 |
| EP | 0484925 | 5/1992 |
| EP | 0556846 | 8/1993 |
| EP | 1467070 | 10/2004 |
| EP | 1733790 | 12/2006 |
| JP | H06108835 | 4/1994 |
| JP | 2000130269 | 5/2000 |
| JP | 2001115831 | 4/2001 |
| WO | WO 2009118986 | 10/2009 |

OTHER PUBLICATIONS

Office Action dated Aug. 26, 2021 issued in Chinese Patent Application No. 201980016290.X.

* cited by examiner

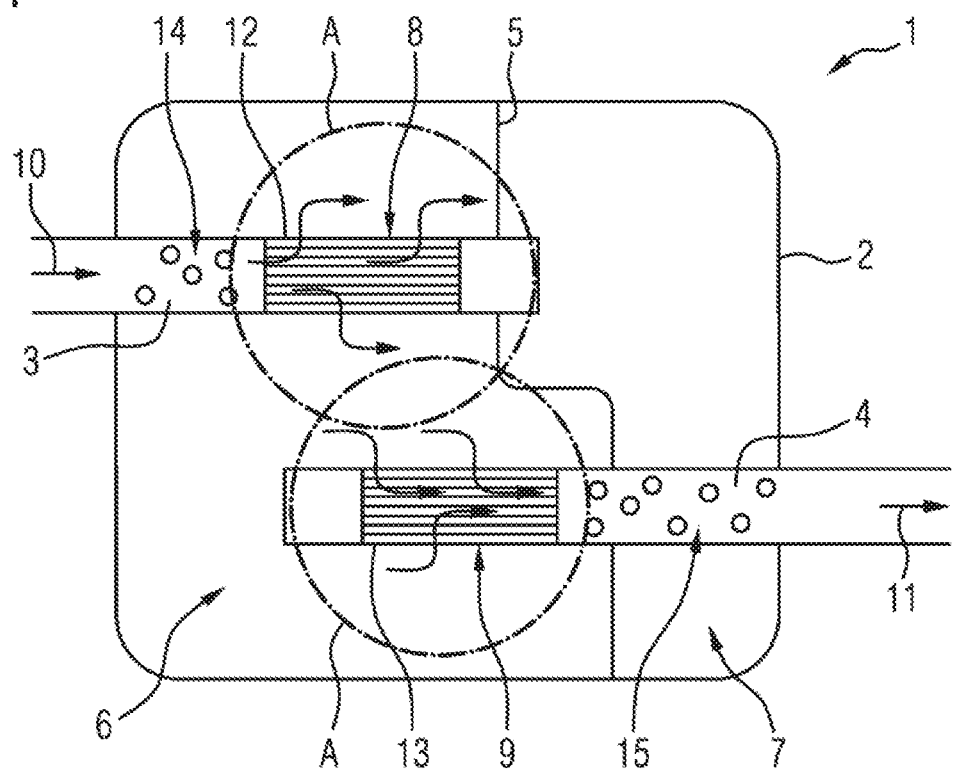
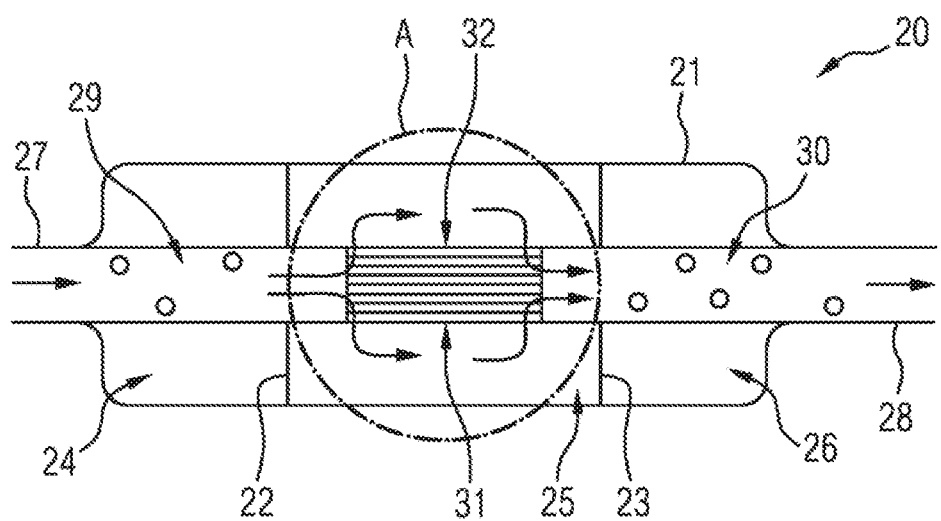

EXHAUST GAS AFTERTREATMENT DEVICE

CROSS REFERENCE TO RELATED APPLICATIONS

This is a U.S. national stage of Application No. PCT/EP2019/054759 filed Feb. 26, 2019. Priority is claimed on German Application No. DE 10 2018 203 066.9 filed Mar. 1, 2018 the content of which is incorporated herein by reference.

BACKGROUND OF THE INVENTION

1. Field of the Invention

The invention relates to a device for aftertreatment of exhaust gases of an internal combustion engine, having at least one catalytic converter, through which exhaust gas can flow, and at least one muffler formed by a closed volume and through which exhaust gas can flow along an inflow section to an outflow section, wherein the catalytic converter is formed by a honeycomb body that has a plurality of flow channels through which exhaust gas can flow, wherein the honeycomb body is accommodated in a casing tube, which surrounds the honeycomb body, and is connected to the casing tube in a materially bonded manner.

2. Description of Related Art

The catalytic converters for exhaust gas aftertreatment of an internal combustion engine are integrated into the exhaust line in order to aftertreat the exhaust gas produced by the internal combustion engine and in this way to reduce the exhaust emissions into the environment. For this purpose, the catalytic converters are usually connected via pipes to the outlet of the internal combustion engine and to the inlet into the various mufflers within the exhaust line.

The disadvantage with this structure of the exhaust line is that the catalytic converters generally have a significantly larger diameter than the pipes used for connection. Consequently, there are a number of abrupt changes of flow cross section during flow through the exhaust system from the internal combustion engine to the exhaust outlet. These changes in the flow cross section, especially the transitions from the sections of relatively large flow cross section to sections of relatively small flow cross section, lead to severe pressure losses, which is disadvantageous for maximum efficiency of operation of the internal combustion engine.

SUMMARY OF THE INVENTION

The problem addressed by one aspect of the present invention is providing a device for exhaust gas aftertreatment which, on the one hand, allows exhaust gas cleaning that matches the legal stipulations and, on the other hand, has sufficient mufflers to comply with legal stipulations relating to noise emissions, while, at the same time, the pressure loss that occurs in the exhaust line should be minimized.

One aspect of the invention relates to a device for the aftertreatment of exhaust gases of an internal combustion engine, having at least one catalytic converter, through which exhaust gas can flow, and at least one muffler formed by a closed volume and through which exhaust gas can flow along an inflow section to an outflow section, wherein the catalytic converter is formed by a honeycomb body that has a plurality of flow channels through which exhaust gas can flow, wherein the honeycomb body is accommodated in a casing tube, which surrounds the honeycomb body, and is connected to the casing tube in a materially bonded manner, wherein the catalytic converter is arranged in the interior of the muffler.

The closed volume of a muffler is formed by a metal housing, for example. The flow of exhaust gas into and out of this housing is possible only over defined paths, namely the inflow section and the outflow section. Averaging of the sound pressure amplitudes can be achieved within the muffler by the reflection of the sound by a plurality of chambers, whereby it is possible to achieve a reduction in the sound pressure peaks. In addition, baffles or selective changes in cross section can be provided in the volume of the muffler to further lower the sound pressure peaks. In addition or alternatively, the principal of absorption can be employed, wherein a porous material, e.g. glass wool or rock wool, is arranged in the interior of the muffler and absorbs the sound energy and converts it into heat.

The general principles of operation of mufflers are widely known in the prior art and can be employed in the known form in the muffler according to aspects of the invention.

The inflow section and the outflow section are advantageously formed by pipes, by which the device is connected to the exhaust line coming from the internal combustion engine. The outflow section can emerge directly into the environment, for example, and thus form the exhaust outlet region. As an alternative, the outflow section of the muffler under consideration can also lead into another muffler, e.g. if a plurality of mufflers is arranged in series in the exhaust section. The inflow section and the outflow section advantageously each have the same line cross sections as the preceding or following line segments of the exhaust line. Unwanted pressure losses due to abrupt changes in cross section are thereby avoided.

The honeycomb body is preferably formed from metal foils, which are embodied alternately with a structured and a smooth surface, for example, and have been stacked one upon the other to form a stack of layers before they are wound to produce the honeycomb body. In this way, a multiplicity of flow channels can be produced, through which a flow can pass in an axial direction. For fixing and stabilization, the honeycomb body produced in this way is inserted into a casing tube, and is connected to the latter in a materially bonded manner, in particular welded thereto.

It is particularly advantageous on the configuration according to the invention that the catalytic converter, comprising the honeycomb body and the casing tube, is arranged within the muffler, and that the flow cross section of the casing tube is substantially equal to the flow cross section of the inflow section and/or of the outflow section. As a result, there is virtually no change in the cross section through which flow takes place, and consequently no additional pressure loss during throughflow is produced either.

It is particularly advantageous if the catalytic converter is connected fluidically to the inflow section and/or to the outflow section. This is preferable since the catalytic converter, more specifically the casing tube with the honeycomb body arranged therein, can be connected directly to the inflow section and/or the outflow section, thereby ensuring direct flow through the catalytic converter.

It is also advantageous if the cross section of the casing tube is the same size as the flow cross section of the inflow section and/or of the outflow section. This reduces the pressure losses that occur owing to abrupt changes in cross section. The actual flow cross section of the honeycomb body is admittedly somewhat smaller than that of the casing tube, but the reduction in the cross section of flow due to the structure of the honeycomb body is somewhat less than the otherwise customary changes in the cross-sectional areas between the inlet and outlet lines and the catalytic converters.

A preferred exemplary embodiment is characterized in that the inflow section and/or the outflow section are/is formed by a pipe. The inflow section and/or the outflow section are/is preferably connected directly to the remainder of the exhaust line.

It is also preferable if, along their/its extent arranged within the muffler, the inflow section and/or the outflow section have/has openings toward the volume enclosed by the muffler. These openings are advantageous to allow a transfer flow of the exhaust gas from the inflow section to the muffler or a transfer flow from the muffler to the outflow section. As a result, some of the exhaust gas flow can flow through the absorbent in the muffler or can be reflected and deflected by corresponding reflection elements in the muffler, before the exhaust gas finally flows out of the muffler. The openings can be holes that are distributed in the circumferential direction, for example, and extend over a defined axial section.

Moreover, it is advantageous if the walls that form the flow channels formed in the honeycomb body have openings that allow a transfer flow between the flow channels of the honeycomb body in the radial direction of the honeycomb body. This allows gas exchange between the individual flow channels of the honeycomb body. This improves the flow through the honeycomb body in that more uniform distribution of the exhaust gas flow across the entire cross section of flow of the honeycomb body is produced. Foil designs for the construction of a honeycomb body that allows such a transfer flow are widely known and can be used to produce a honeycomb body according to one aspect of the invention.

It is furthermore advantageous if the casing tube accommodating the honeycomb body has openings that allow a transfer flow from the honeycomb body toward the volume enclosed by the muffler. Openings in the casing tube allow a transfer flow of the exhaust gas from the catalytic converter into the volume of the muffler. In the same way, the openings also allow a transfer flow of exhaust gas from the muffler into the catalytic converter. In this way, some of the exhaust gas already treated in the catalytic converter is also passed into the volume of the muffler, thereby making it possible to achieve a further noise reduction. If the catalytic converter is arranged close to the outflow section, exhaust gas that has already flowed through the muffler can be fed back to the catalytic converter and finally expelled from the muffler via the outflow section.

It is also expedient if the casing of the catalytic converter forms an intermediate tube, via which the inflow section is connected fluidically to the outflow section. In this case, the catalytic converter is supplied with exhaust gas entirely via the inflow section connected upstream thereof, and the exhaust gas which has flowed through the catalytic converter is discharged entirely via the outflow section.

In this case, the inflow section and the outflow section ideally have openings by which fluid communication with the internal volume of the muffler is possible.

Moreover, it is advantageous if the muffler is divided into two mutually separate partial volumes, wherein the inflow section leads from the outside through the first partial volume and emerges into the second partial volume, wherein the outflow section leads from the first partial volume through the second partial volume and emerges outside the muffler, wherein respective catalytic converters are arranged in the inflow section and in the outflow section within the first partial volume.

A plurality of partial volumes is advantageous to achieve better noise reduction. By virtue of the deflection of the exhaust gas within the muffler and the flow through a plurality of chambers, the noise level is reduced overall.

The abovementioned construction of the device is advantageous in order, on the one hand, to ensure sufficient aftertreatment of the exhaust gas and, at the same time, to achieve as great a noise reduction as possible without producing an unnecessarily high pressure loss in the process.

It is furthermore expedient if the inflow section has openings via which the inflow section is in fluid communication with the first partial volume. By such openings, it is possible to enable a transfer flow of the exhaust gas from the inflow section into the volume of the muffler, even without the need for the exhaust gas first of all to flow through the catalytic converter.

It is also advantageous if the outflow section has openings via which the outflow section is in fluid communication with the second partial volume. The openings in the outflow section enable the exhaust gas in the volume of the muffler to flow across into the outflow section and out of the muffler. By skillful arrangement of the catalytic converters and a corresponding fluidic connection to the partial volume of the muffler, it is possible to ensure that the exhaust gas flows through the muffler with a pressure loss which is as small as possible, while division into a plurality of flow paths is achieved. The individual flow paths flow successively, in different sequences, through the inflow section, the catalytic converters, the partial volumes of the muffler, and the outflow section.

Moreover, it is preferable if the muffler is subdivided into a plurality of partial volumes, wherein the individual partial volumes are in fluid communication with one another via a pipe formed by an inflow section and/or an outflow section and/or an intermediate tube.

A plurality of partial volumes is advantageous to ensure as great a noise reduction as possible. In an advantageous configuration, the casing tube of the catalytic converter forms an intermediate tube. The openings in the casing tube enable exhaust gas to flow through the catalytic converter into one of the partial volumes and also to flow back out of this partial volume, through the openings in the casing tube, into the catalytic converter. Before and after this, the exhaust gas can flow out of the inflow section and the outflow section, respectively, through the openings into respectively dedicated partial volumes, and likewise back out of the volumes.

Advantageous developments of the present invention are described in the dependent claims and in the following description of the figures.

BRIEF DESCRIPTION OF THE DRAWINGS

The invention will be explained in detail in the following text on the basis of exemplary embodiments with reference to the drawings. In the drawings:

FIG. 1 is a schematic view of a muffler having two partial volumes and two catalytic converters;

FIG. 2 is a schematic view of a muffler having three partial volumes and a catalytic converter arranged in the central partial volume.

DETAILED DESCRIPTION OF THE PRESENTLY PREFERRED EMBODIMENTS

Figure 3:
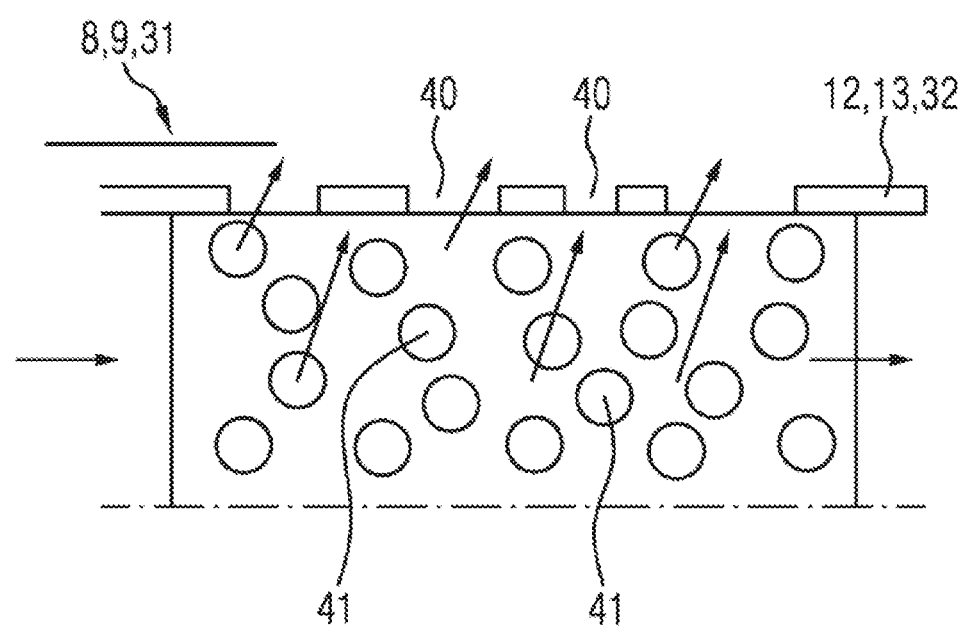
FIG. 3 is a detail view of the casing tube and of a foil layer of the catalytic converter, wherein, in particular, the radial openings used to produce the permeability of the matrix of the honeycomb body and of the casing are illustrated.

FIG. 1 shows a muffler 1 formed by a housing 2. An exhaust gas flow can flow into the housing 2 along an inflow section 3 and can flow out of the housing 2 through an outflow section 4. The inflow section 3 and the outflow section 4 are formed by pipes, which are preferably connected to the remainder of the exhaust line.

The volume of the muffler 1 is divided in the interior into two partial volumes 6 and 7 by a partition wall 5. Two catalytic converters 8 and 9 are arranged in the first partial volume 6. The catalytic converters are designed as metal honeycomb bodies and have a plurality of flow channels, through which flow can take place substantially axially in the inflow direction 10 and the outflow direction 11. The metal honeycomb bodies are arranged in a casing tube 12 and 13, respectively, and are connected to the latter in a materially bonded manner. The first catalytic converter 8 is connected directly to the inflow section 3, and the second catalytic converter 9 is connected directly to the outflow section 4. The cross-sectional area of flow through the inflow and outflow section 3, 4 and the casing tubes 12, 13 is identical, and therefore, in particular, no abrupt changes in the cross section of flow are provided.

In the interior of the housing 2, the inflow section 3 and the outflow section 4 each have a plurality of openings 14, 15, via which a transfer flow of the exhaust gas between the interior of the flow sections 3, 4 and the partial volumes 6, 7 is made possible.

The flow channels within the honeycomb bodies of the catalytic converters 8, 9 have openings that allow a radial transfer flow between the individual flow channels. Furthermore, the casing tubes 12, 13 likewise have openings that allow a transfer flow between the flow channels of the honeycomb body and the interior of the muffler, in particular of the first partial volume 6.

The first catalytic converter 8 is passed through the partition wall 5 and thus emerges into the second partial volume 7. The second catalytic converter 9 is passed through the partition wall 5 and emerges into the outflow section 4, which is passed through the second partial volume 7 and finally emerges outside the muffler 1.

Thus, different flow paths along which the exhaust gas flows through the muffler 1 are obtained. One possible flow path for the exhaust gas runs along the inflow section 3, through the catalytic converter 8, into the second volume 7. From there, it runs through the openings 15 into the outflow section 4 and out of the housing 2 of the muffler 1.

Another flow path runs via the inflow section 3 into the first catalytic converter 8 and there in a radial direction through the openings into the flow channels and the casing tube 12 into the first partial volume 6. The exhaust gas can flow into the second catalytic converter 9 in an axial direction from the first partial volume 6. Alternatively, the exhaust gas can flow out of the first partial volume 6 in a radial direction of the second catalytic converter 9 through the openings of the jacket tube 13 and the openings in the flow channels into the second catalytic converter 9. In both cases, the exhaust gas flows from there out of the housing 2 of the muffler 1 along the outflow section 4.

It is furthermore possible for the exhaust gas to flow directly into the first partial volume 6 through the openings 14 of the inflow section 3 and, from there, into the second catalytic converter 9 on the above-described path in an axial or radial direction.

In this way, the exhaust gas can advantageously flow through the muffler 1 over different paths, thereby making it possible to achieve an optimum reduction in the sound level. In the muffler 1, absorbents, e.g. glass wool, can be provided or, alternatively or in addition, reflection elements, which ensure that multiple reflection of the soundwaves takes place within the muffler 1 in order to further reduce the sound level.

The construction in FIG. 1 ensures that the exhaust gas flows through at least one of the two catalytic converters 8, 9 before the exhaust gas flows back out of the muffler 1. Depending on the flow path, flow through both catalytic converters 8, 9 is also possible, and this leads, in particular, to improved exhaust gas aftertreatment.

FIG. 2 shows another schematic view of a muffler 20 having a housing 21, which is divided into three partial volumes 24, 25, and 26 by partition walls 22, 23.

An inflow section 27 leads into the housing 21 of the muffler 20, and an outflow section 28 leads out of the housing 21 of the muffler 20. The flow sections 27, 28 have openings 29, 30 in the interior of the housing 21, wherein the openings 29 allow a transfer flow between the inflow section 27 and the first partial volume 24, while the openings 30 allow a transfer flow between the outflow section 28 and the third partial volume 26.

Formed in the central second partial volume 25 is the catalytic converter 31, which is arranged in a casing tube 32 acting as an intermediate tube. Via the intermediate tube 32, the inflow section 27 and the outflow section 28 are connected fluidically to one another.

The catalytic converter 31 is of similar construction to the two catalytic converters in FIG. 1 and likewise has a metal honeycomb structure, which has a plurality of flow channels that allow axial flow, wherein the walls of the flow channels have openings that allow a radial transfer flow between the flow channels. Moreover, the casing tube 32 also has openings which allow a transfer flow between the interior of the catalytic converter 31 and the second partial volume 25.

By the transfer flow of the exhaust gas between the flow sections 27, 28 and the interior of the catalytic converter 31 and the partial volumes 24, 25, and 26, it is possible, in particular, to achieve a reduction in the sound level. As already described in FIG. 1, the partial volumes can have absorbents or reflection elements, which serve to reduce the sound level.

FIG. 3 shows a detail view of the three catalytic converters 8, 9 and 31 from FIGS. 1 and 2. The segment shown in FIG. 3 is denoted in FIGS. 1 and 2 by the reference sign A.

It shows in detail how the respective casing tubes 12, 13, and 32 have openings 40, through which the exhaust gas flowing through the honeycomb body can flow out of the catalytic converter 8, 9 and 31 and can flow across into the interior of the muffler 1, 20. Also shown are the openings 41, which allow a radial transfer flow between the flow channels of the honeycomb body. In this way, on the one hand, homogenization of the exhaust gas flowing through the catalytic converters 8, 9 and 31 can be achieved and, furthermore, a further reduction in the sound level can be achieved by a deflection of the flowing exhaust gas into the interior of the muffler 1, 20. Depending on the flow direction, the exhaust gas can also flow across into the catalytic converter 8, 9 and 31 from the muffler via the openings 40.

The construction of the individual elements shown in FIGS. 1 to 3 is schematic and merely illustrative. In particular, the type, size and number of openings, the diameters and cross sections of the flow sections and of the catalytic converters is illustrative and is not of a respective nature. The illustrations serve to illustrate the concept of aspects of the invention.

The different features of the individual exemplary embodiments can also be combined with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for aftertreatment of exhaust gases of an internal combustion engine, comprising:
   at least one muffler formed by a closed volume and through which the exhaust gases can flow along an inflow section to an outflow section; and
   at least one catalytic converter arranged in an interior of the at least one muffler and through which the exhaust gases can flow, the at least one catalytic converter comprising:
      a casing tube; and
      a honeycomb body accommodated in the casing tube that surrounds the honeycomb body, and which has a plurality of flow channels through which the exhaust gases can flow;
   wherein the honeycomb body is connected to the casing tube in a materially bonded manner,
   wherein walls that form the plurality of flow channels formed in the honeycomb body have openings which allow a bidirectional transfer flow between the plurality of flow channels of the honeycomb body in a radial direction of the honeycomb body, and
   wherein the casing tube accommodating the honeycomb body has openings which allow a bidirectional transfer flow from the honeycomb body toward a volume enclosed by the at least one muffler.

2. The device as claimed in claim 1, wherein the at least one catalytic converter is fluidically connected to the inflow section and/or to the outflow section.

3. The device as claimed in claim 1, wherein a cross section of the casing tube is the same size as a flow cross section of the inflow section and/or of the outflow section.

4. The device as claimed in claim 1, wherein the inflow section and/or the outflow section are/is formed by a pipe.

5. The device as claimed in claim 1, wherein, along its extent arranged within the at least one muffler, at least one of the inflow section and the outflow section has openings toward a volume enclosed by the at least one muffler.

6. The device as claimed in claim 1, wherein the casing of the at least one catalytic converter forms an intermediate tube, via which the inflow section is connected fluidically to the outflow section.

7. The device as claimed in claim 1,
   wherein the at least one muffler is divided into two mutually separate partial volumes comprising a first partial volume and a second partial volume,
   wherein the inflow section leads from an outside through the first partial volume and emerges into the second partial volume,
   wherein the outflow section leads from the first partial volume through the second partial volume and emerges outside the at least one muffler,
   wherein respective catalytic converters are arranged in the inflow section and in the outflow section within the first partial volume.

8. The device as claimed in claim 7, wherein the inflow section has openings via which the inflow section is in fluid communication with the first partial volume.

9. The device as claimed in claim 7, wherein the outflow section has openings via which the outflow section is in fluid communication with the second partial volume.

10. The device as claimed in claim 8, wherein the outflow section has openings via which the outflow section is in fluid communication with the second partial volume.

11. The device as claimed in claim 1,
   wherein the at least one muffler is subdivided into a plurality of partial volumes,
   wherein individual partial volumes are in fluid communication with one another via a pipe formed by a respective inflow section and/or a respective outflow section and/or a respective intermediate tube.

* * * * *